US010886997B2

(12) United States Patent
Lu et al.

(10) Patent No.: US 10,886,997 B2
(45) Date of Patent: Jan. 5, 2021

(54) METHODS AND DEVICES FOR PROCESSING UPLINK SIGNALS

(71) Applicant: Telefonaktiebolaget LM Ericsson (publ), Stockholm (SE)

(72) Inventors: Chenguang Lu, Sollentuna (SE); Miguel Berg, Sollentuna (SE); Yezi Huang, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/622,355

(22) PCT Filed: Jun. 14, 2017

(86) PCT No.: PCT/SE2017/050633
§ 371 (c)(1),
(2) Date: Dec. 13, 2019

(87) PCT Pub. No.: WO2018/231107
PCT Pub. Date: Dec. 20, 2018

(65) Prior Publication Data
US 2020/0204248 A1    Jun. 25, 2020

(51) Int. Cl.
*H04B 7/08* (2006.01)
*H04B 7/0452* (2017.01)
*H04L 5/00* (2006.01)

(52) U.S. Cl.
CPC ......... *H04B 7/0837* (2013.01); *H04B 7/0452* (2013.01); *H04L 5/0048* (2013.01)

(58) Field of Classification Search
CPC .... H04B 7/024; H04B 7/0413; H04B 7/0874; H04B 7/0837; H04B 7/0452; H04L 5/0048
See application file for complete search history.

(56) References Cited

U.S. PATENT DOCUMENTS

| 9,124,333 B1* | 9/2015 | Mansour | H04B 7/0837 |
| 2005/0245207 A1* | 11/2005 | Suzuki | H04B 1/18 455/101 |
| 2013/0170574 A1* | 7/2013 | Fleming | H04B 7/0888 375/267 |

(Continued)

OTHER PUBLICATIONS

5G Transport Network Requirements for the Next Generation Fronthaul Interface by J. Bartlet et al.; EURASIP Journal on Wireless Communications and Networking—2017.

(Continued)

*Primary Examiner* — Sung S Ahn
(74) *Attorney, Agent, or Firm* — Baker Botts, LLP (57) ABSTRACT

There is provided mechanisms for processing uplink signals. A method is performed by a RRU (200). The method comprises obtaining uplink signals (S102) as received from wireless devices at antenna elements of an antenna array of the RRU (200), wireless device being associated with its own at least one user layer. The method comprises capturing (S104) energy per user layer by combining the received uplink signals from the antenna array for each user layer into combined signals, resulting in one combined signal per user layer. The combining for each individual user layer is based on channel coefficients of the wireless device associated with said each individual user layer. The method comprises providing (S106) the combined signals to a BBU (300).

22 Claims, 6 Drawing Sheets

(56) References Cited

U.S. PATENT DOCUMENTS

2014/0226736 A1    8/2014   Niu et al.
2015/0270882 A1    9/2015   Shattil

OTHER PUBLICATIONS

Low RF-Complexity Millimeter-Wave Beamspace-MIMO Systems by Beam Selection by Pierluigi v. Amadori and Christos Masouros; IEEE Transactions on Communications, vol. 63, No. 6—Jun. 2015.
PCT International Search Report for International application No. PCT/SE2017/050633—dated Apr. 23, 2018.
Uplink Joint Reception With LLR Forwarding for Optical Transmission Bandwidth Reduction in Mobile Fronthaul by Kenji Miyamoto et al.; NTT Access Network Service Systems Laboratories, NTT Corporation—2015.
PCT Written Opinion of the International Searching Authority for International application No. PCT/SE2017/050633—dated Apr. 23, 2018.
Optimized Uplink Transmission in Multi-Antenna C-RAN With Spatial Compression and Forward by Liang Liu and Rui Zhang; IEEE Transactions on Signal Processing, vol. 63, No. 19—Oct. 1, 2015.
A Prefiltering C-RAN Architecture With Compresed Link Data Rate in Massive MIMO by Wenting Chang et al., IEEE—2016.
Extended European Search Report issued for Application No./Patent No. 17913728.6-1220/3639389 PCT/SE2017050633—Nov. 4, 2020.

\* cited by examiner

METHODS AND DEVICES FOR PROCESSING UPLINK SIGNALS

PRIORITY

This nonprovisional application is a U.S. National Stage Filing under 35 U.S.C. § 371 of International Patent Application Serial No. PCT/SE2017/050633 filed Jun. 14, 2017 and entitled "METHODS AND DEVICES FOR PROCESSING UPLINK SIGNALS" which is hereby incorporated by reference in its entirety.

TECHNICAL FIELD

Embodiments presented herein relate to methods, a remote radio unit, a baseband unit, an access node, computer programs, and a computer program product for processing uplink signals.

BACKGROUND

In communications networks, there may be a challenge to obtain good performance and capacity for a given communications protocol, its parameters and the physical environment in which the communications network is deployed.

For example, the introduction of digital beamforming antenna systems in access nodes, such as radio base stations, etc., could allow multiple simultaneous narrow beams to be used to provide network access to, and thus server, multiple simultaneous served wireless devices, such as user equipment (UE), etc.

For example, so-called massive multiple input multiple output (MIMO) systems have been proposed to improve the spectrum efficiency fulfilling requirements for fifth generation (5G) telecommunications systems. A massive MIMO system could be used together with a large number of antennas on the network side, where the number of antennas is much higher than the number of user-layers, for example, 64 antennas with 8 or 16 user-layers.

Massive MIMO is often referred to as massive beamforming, where beamforming involves generating narrow beams pointing in different directions. Massive MIMO mainly benefit from multi-user MIMO which enables transmissions to, and reception from, multiple users simultaneously over separate spatial channels.

Traditionally, the functionality of the access node at the network side has been split between a baseband unit (BBU) and at least one remote radio unit (RRU) as interconnected by a fronthaul (FH) interface, thus resulting in a so-called main-remote design. In such a main-remote design, time domain samples of each antenna-carrier are transported over the FH interface. Traditionally, communications over the FH interface has been implemented using the Common Public Radio Interface (CPRI) protocol. Further, traditionally, the BBU has been responsible for carrying out baseband processing of signals whilst the RRU has been responsible for carrying out radiofrequency processing of the signals. Another name for the BBU is radio equipment controller (REC). Another name for RRU is remote radio head (RRH) or radio equipment (RE).

As the number of antennas at the access node is expected to increase, so does the required FH interface capacity, thus increase the transport cost of the FH interface. To overcome this, a new functional split, or distribution in the physical (PHY) layer, could be used. Some baseband PHY layer functions could be moved to the RRU from the BBU. In the extreme, the main-remote design could be collapsed by completely removing the FH interface and putting the functionality of the BBU in the RRU. In general terms, in this case, the RRU becomes a base station.

However, computational operations in massive MIMO are processing intensive and commonly need to be performed in real time. The more such complicated operations are moved into the RRU, the more complex the RRU has to be designed.

In view of the above, there is still a need for improved BBU-RRU arrangements.

SUMMARY

An object of embodiments herein is to provide efficient processing of uplink signals that could be used to improve the performance of a BBU-RRU arrangement.

According to a first aspect there is presented a method for processing uplink signals. The method comprises obtaining, by a RRU, uplink signals as received from wireless devices at antenna elements of an antenna array of the RRU, each wireless device being associated with its own at least one user layer. The method comprises capturing, by the RRU, energy per user layer by combining the received uplink signals from the antenna array for each user layer into combined signals, resulting in one combined signal per user layer. The combining for each individual user layer is based on channel coefficients of the wireless device associated with said each individual user layer. The method comprises providing, by the RRU, the combined signals to a BBU. The method comprises obtaining, by the BBU, the combined signals from the RRU. The method comprises performing, by the BBU, interference cancellation on each of the combined signals, resulting in interference cancelled combined signals. The method comprises separating, by the BBU, the interference cancelled combined signals into separated uplink signals for each user layer such that there is one separate user layer for each separated uplink signal.

According to a second aspect there is presented a method for processing uplink signals. The method is performed by a RRU. The method comprises obtaining uplink signals as received from wireless devices at antenna elements of an antenna array of the RRU, each wireless device being associated with its own at least one user layer. The method comprises capturing energy per user layer by combining the received uplink signals from the antenna array for each user layer into combined signals, resulting in one combined signal per user layer. The combining for each individual user layer is based on channel coefficients of the wireless device associated with said each individual user layer. The method comprises providing the combined signals to a BBU.

According to a third aspect there is presented a RRU for processing uplink signals. The RRU comprises processing circuitry. The processing circuitry is configured to cause the RRU to obtain uplink signals as received from wireless devices at antenna elements of an antenna array of the RRU, each wireless device being associated with its own at least one user layer. The processing circuitry is configured to cause the RRU to capture energy per user layer by combining the received uplink signals from the antenna array for each user layer into combined signals, resulting in one combined signal per user layer. The combining for each individual user layer is based on channel coefficients of the wireless device associated with said each individual user layer. The processing circuitry is configured to cause the RRU to provide the combined signals to a BBU.

According to a fourth aspect there is presented a RRU for processing uplink signals. The RRU comprises an obtain module configured to obtain uplink signals as received from wireless devices at antenna elements of an antenna array of the RRU, each wireless device being associated with its own at least one user layer. The RRU comprises a capture module configured to capture energy per user layer by combining the received uplink signals from the antenna array for each user layer into combined signals, resulting in one combined signal per user layer. The combining for each individual user layer is based on channel coefficients of the wireless device associated with said each individual user layer. The RRU comprises a provide module configured to provide the combined signals to a BBU.

According to a fifth aspect there is presented a computer program for processing uplink signals. The computer program comprises computer program code which, when run on processing circuitry of a RRU, causes the RRU to perform a method according to the second aspect.

According to a sixth aspect there is presented method for processing uplink signals. The method is performed by a BBU. The method comprises obtaining combined signals from a RRU. Each combined signal represents a combination of uplink signals received from wireless devices at antenna elements of an antenna array of the RRU, each wireless device being associated with its own at least one user layer. The method comprises performing interference cancellation on each of the combined signals, resulting in interference cancelled combined signals. The method comprises separating the interference cancelled combined signals into separated uplink signals for each user layer such that there is one separate user layer for each separated uplink signal.

According to a seventh aspect there is presented a BBU for processing uplink signals. The BBU comprises processing circuitry. The processing circuitry is configured to cause the BBU to obtain combined signals from a RRU. Each combined signal represents a combination of uplink signals received from wireless devices at antenna elements of an antenna array of the RRU, each wireless device being associated with its own at least one user layer. The processing circuitry is configured to cause the BBU to perform interference cancellation on each of the combined signals, resulting in interference cancelled combined signals. The processing circuitry is configured to cause the BBU to separate the interference cancelled combined signals into separated uplink signals for each user layer such that there is one separate user layer for each separated uplink signal.

According to an eighth aspect there is presented a BBU for processing uplink signals. The BBU comprises an obtain module configured to obtain combined signals from a RRU. Each combined signal represents a combination of uplink signals received from wireless devices at antenna elements of an antenna array of the RRU, each wireless device being associated with its own at least one user layer. The BBU comprises an interference cancellation module configured to perform interference cancellation on each of the combined signals, resulting in interference cancelled combined signals. The BBU comprises a separate module configured to separate the interference cancelled combined signals into separated uplink signals for each user layer such that there is one separate user layer for each separated uplink signal.

According to a ninth aspect there is presented a computer program for processing uplink signals, the computer program comprising computer program code which, when run on processing circuitry of a BBU, causes the BBU to perform a method according to the sixth aspect.

According to a tenth aspect there is presented a computer program product comprising a computer program according to at least one of the fifth aspect and the ninth aspect and a computer readable storage medium on which the computer program is stored. The computer readable storage medium could be a non-transitory computer readable storage medium.

According to an eleventh aspect there is presented an access node comprising at least one RRU according to the third or fourth aspect and a BBU according to the seventh or eight aspects.

Advantageously these methods, these RRUs, these BBUs, this access node, and these computer programs provide efficient processing of uplink signals that could be used improve the performance of a BBU-RRU arrangement comprising the proposed BBU and RRU.

Advantageously these methods, these RRUs, these BBUs, this access node, and these computer programs enable high performance to be achieved at the air interface of the RRU whilst keeping the complexity in the RRU low and reducing the capacity of the interface between the BBU and the RRU to match the number of user layers.

Advantageously these methods, these RRUs, these BBUs, this access node, and these computer programs are scalable and support a large number of antennas, for example enabling more RRUs to be connected to the same BBU and increasing the BBU capacity, without needing to replace the RRU with a new RRU.

Advantageously these methods, these RRUs, these BBUs, this access node, and these computer programs enable computational complexity requirements in the RRU to be reduced by combining only a subset of the antennas or directions.

Advantageously these methods, these RRUs, these BBUs, this access node, and these computer programs enable advanced channel estimation methods, such as successive interference cancellation, to be applied in the BBU to further improve the performance.

Advantageously these methods, these RRUs, these BBUs, this access node, and these computer programs can be applied to active distributed antenna systems, e.g. a radio dot system (RDS), and improve the performance of such systems.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above there is still a need for improved BBU-RRU arrangements.

Further, the inventors of the present inventive concept have realized that a desirable processing split between the RRU and BBU should try to meet at least the following three requirements:

A first requirement is to keep high performance. The performance should be as good as, or at least very close to, the performance achievable with a traditional main-remote design, for example based on the CPRI-type of FH interface, which represents the best achievable performance.

A second requirement is to keep a low capacity requirement for the FH interface, which should be decoupled from the number of antennas. It is reasonable to keep the number of streams on the FH interface down to the number of user layers (optionally, the number of streams on the FH interface could be kept down to the number of user layers multiplied by the number of polarization directions).

A third requirement is to keep the computational complexity needed in the RRU low. One main constraint for complexity is in the real-time calculation and update of beamforming weight coefficients. Such calculations could be processing intensive if all MIMO-related processing is implemented in RRU, since MIMO-related processing commonly involves performing a comparatively large matrix inversion. Inversion of a large matrix is generally considered as requiring quite a high computational complexity. Reducing the computational complexity needed in the RRU could increase scalability and thus to support an increasing number of antenna elements. It could even be desirable to increase the number of RRUs whilst increasing the available computational resources in the BBU when needing to support more antenna elements. Unlike the box design of RRU, BBU is always designed with scalability. Keeping a low complexity in the RRU will also help the RRU to reduce its power consumption, its size and its weight.

Figure 1:
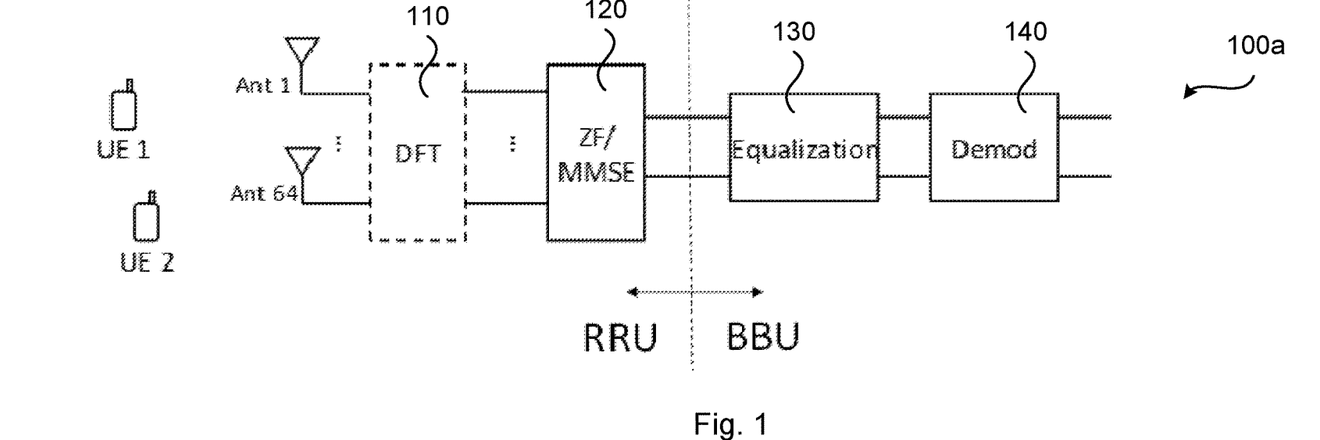
FIGS. 1 and 2 are block diagrams of BBU-RRU arrangement.
Figure 2:
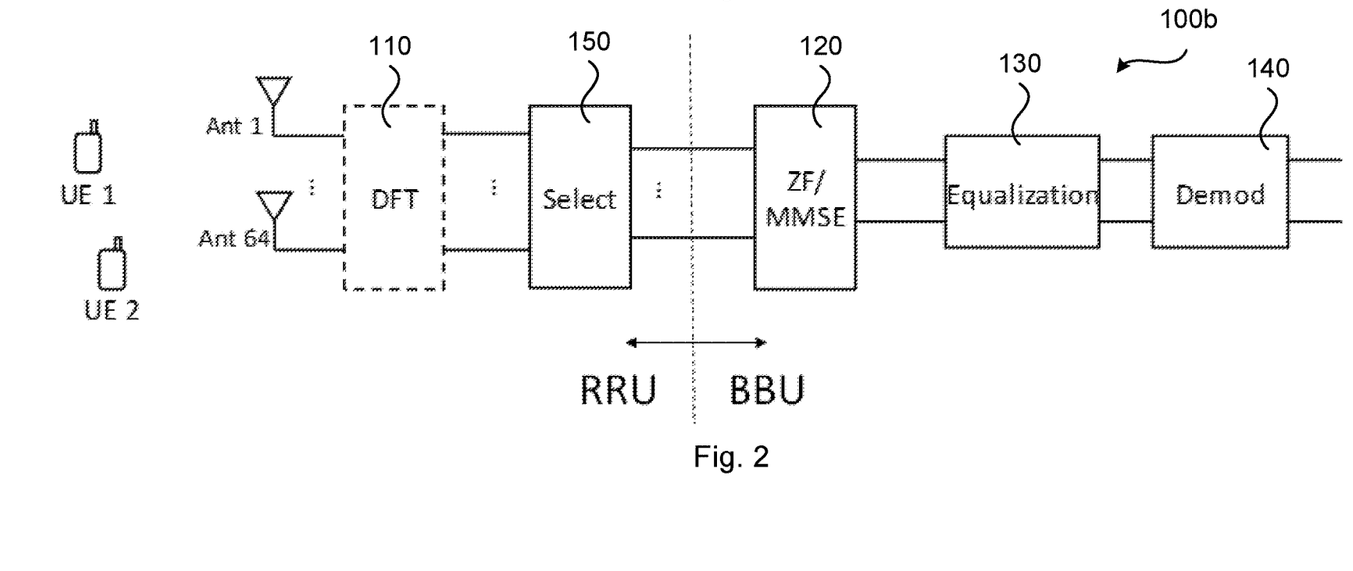

There could be different approaches regarding the functional split between RRU and BBU. FIGS. 1 and 2 give two examples of such functional splits.

In particular, FIGS. 1 and 2 show block diagrams of BBU-RRU arrangements 100a, 100b with two different examples of functional splits regarding beamforming or MIMO operations between the BBU and the RRU for uplink processing of signals received at the antennas (Ant 1, . . . , Ant 64) of the access node from served wireless devices (UE 1, UE2). The functional split is marked by a dotted line. Each BBU-RRU arrangements 100a, 100b comprises an optional discrete Fourier transform (DFT) block 110 performing a DFT on the uplink signals of a subcarrier across all antenna elements, which transforms the received signals into the direction domain, a zero-forcing (ZF) interference cancellation or minimum mean square error (MMSE) interference cancellation block 120 configured to perform interference cancellation on the transformed signals, an equalization block 130 configured to perform equalization on the signals after interference cancellation, and a demodulation block 140 configured to demodulate the equalized signals. The BBU-RRU arrangement limb further comprises a select block 150 configured to select only a subset of the signals received from different directions or antenna elements.

The block diagram in FIG. 1 represents an example of a BBU-RRU arrangement where full interference cancellation of the uplink signals is performed by the RRU. One drawback of this example is that the complexity for calculating the cancellation coefficients is quite high, resulting in high computational requirements for the RRU.

The block diagram in FIG. 2 represents an example of a BBU-RRU arrangement where the number of signal components is reduced by means of antenna or direction selection in the RRU before sending samples of the uplink signals to the BBU for interference cancellation. This process is sometimes referred to as dimension reduction. One drawback of this example is that information could be lost when reducing the number of signal components.

In some aspects a frequency domain implementation for an OFDM system, such as the so-called Long Term Evolution (LTE) and New Radio (NR) telecommunications systems are assumed. The uplink signals received at each antenna element are thus first transformed by a DFT to frequency domain. This DFT block is neglected in FIGS. 1 and 2, to simplify the mathematical modeling and illustration. Basically, in FIGS. 1 and 2, the uplink signal received at each antenna element represents a subcarrier.

According to a first approach illustrated in FIG. 1 operations required for massive MIMO processing is performed in the RRU. This approach is able to meet the first and second requirements. But the required computational complexity of the RRU needs to be quite high, considering for example the computational complexity for determining the beamforming or MIMO coefficients. Further, this approach does not scale well.

A second approach illustrated in FIG. 2 is to reduce the needed required computational complexity in RRU by selecting the uplink signals only for a subset of antenna elements or directions and transporting the selected uplink signals over the FH interface to the BBU for further processing (e.g. relating to MIMO operation). In this approach, the selection operations are quite simple, thus fulfilling the third requirement. However, in order to achieve as high performance as the first approach, the subset of antenna elements or directions needs to be comparatively large, which will significantly increase the capacity of the FH interface compared to the first approach. The second approach would thus not fulfil the second requirement.

The embodiments disclosed herein therefore relate to mechanisms for processing uplink signals. In order to obtain such mechanisms there is provided a RRU 200, a method performed by the RRU 200, a computer program product comprising code, for example in the form of a computer program, that when run on processing circuitry of the RRU 200, causes the RRU 200 to perform the method. In order to obtain such mechanisms there is further provided a BBU 300, a method performed by the BBU 300, and a computer program product comprising code, for example in the form of a computer program, that when run on processing circuitry of the BBU 300, causes the BBU 300 to perform the method.

Figure 3:
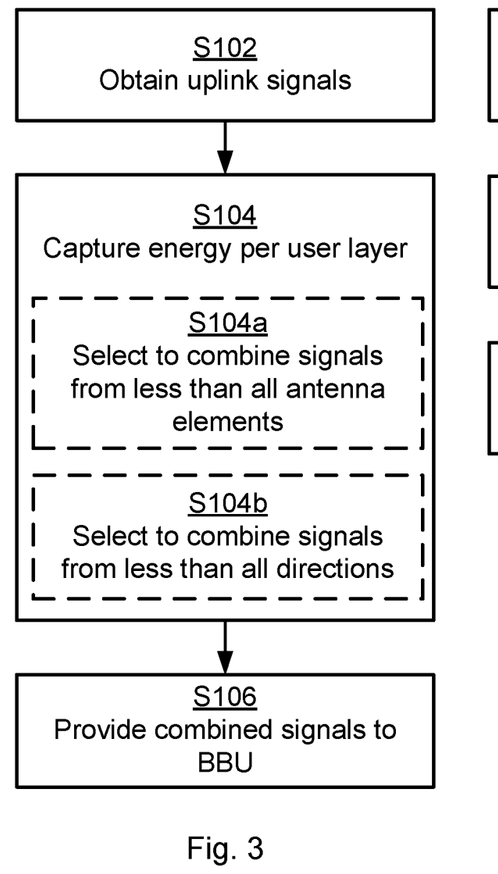
FIGS. 3 and 4 are flowcharts of methods according to embodiments.

Reference is now made to FIG. 3 illustrating a method for processing uplink signals as performed by the RRU 200 according to an embodiment.

The RRU processes signals received from wireless devices at antenna elements of an antenna array of the RRU. Thus, the RRU is configured to perform step S102:

S102: The RRU 200 obtains uplink signals as received from wireless devices at antenna elements of an antenna array of the RRU 200. Each wireless device is associated with its own at least one user layer.

The RRU, from each user layer perspective, combines the received signals from the antenna elements or directions with an aim to capture most of the energy and hence to maximize the signal to noise ratio (SNR) of each user layer. Particularly, the RRU is configured to perform step S104:

S104: The RRU 200 captures energy per user layer. Energy per user layer is captured by combining the received uplink signals from the antenna array for each user layer into combined signals. This combining results in one combined signal per user layer. The combining for each individual user layer is based on channel coefficients of the wireless device associated with each individual user layer.

Here, the channel coefficients of one individual user layer corresponds to the radio propagation channel from the point in the served wireless devices where the user layer data is transmitted to the point in the RRU where the user layer data in the uplink signals is received from multiple antenna elements or directions. Mathematically, such channel coefficients are often represented as a complex vector, where each vector element denotes one channel coefficient.

In general terms, there is thus one combining operation for each user layer. The thus combined signals are then further processed in the BBU. Thus, the RRU is configured to perform step S106:

S106: The RRU 200 provides the combined signals to the BBU 300.

In some aspects the combined signals are provided to the BBU 300 over a FH interface operatively connected between the RRU 200 and the BBU 300.

This functional split between the RRU 200 and the BBU 300 fulfils all the three requirements stated above.

Embodiments relating to further details of processing uplink signals as performed by the RRU 200 will now be disclosed.

There may be different ways to perform the combining. In general terms, the received uplink signals are combined such that the SNR is improved after the combining, where the noise in the SNR refers to background noise and/or interference from neighbouring cells. For example, the combining could be performed using maximum ratio combining (MRC) which achieves the array gain and diversity gain by coherently combining the uplink signals for each individual user layer to maximize the SNR. The combining could be also performed using interference rejection combining (IRC). IRC can mitigate the interferences from neighboring cells, exploiting the knowledge of the interference channel property which can be estimated. In any case, spatial combining can be also interpreted to form a beam for each user layer to better receive the uplink signal of each user layer. That is, according to an embodiment the received uplink signals are combined using maximum-ratio combining or interference rejection combining.

In some aspects the channel coefficients pertain to at least one channel property of a radio propagation channel extending between the wireless device of said each individual user layer and the antenna array of the RRU 200 in a direction from the wireless device to the antenna array.

In some aspects the determination of the combining coefficients considers the channel coefficients for each user layer. Particularly, according to an embodiment combining coefficients are applied to the uplink signals for combining the received uplink signals, where the combining coefficients are based on the channel coefficients for each user layer.

No matrix inversion is needed in order to determine the combining coefficients.

There are different ways to determine the combining coefficients. For example, the combining coefficients could be determined either in the antenna element domain or in the direction domain. That is, according to an embodiment the combining coefficients are determined either per antenna element or per direction in which the uplink signals are received at the antenna elements. In general terms, here a direction refers to a directive beam pointing in the direction. The directive beams are formed by the applying beamforming weights at the antenna array for a subcarrier or a group of subcarriers.

In general terms, the direction domain is a transformation of the antenna element domain. The direction domain can be interpreted as a domain in which a series of directive beams are simultaneously formed to cover a range of directions.

According to an embodiment the uplink signals per antenna element are transformed to uplink signals per direction before the combining coefficients are applied to the uplink signals per direction. For example, a spatial DFT (i.e. a DFT taken over the antenna elements) could be applied to the uplink signals from the antenna elements in order to transform the uplink signals from the antenna element domain to the direction domain.

Determining the combining coefficients based on the direction domain channel estimation could be advantageous since the channel is more colored and the angular spread is smaller in the direction domain than that in the antenna element domain, thus resulting in higher SNR in the directions for which the uplink signals are concentrated. Thus, the channel coefficients can be estimated more accurately.

The combining in step S104 could be performed either in the antenna element domain or in the direction domain. That is, according to an embodiment the combining coefficients are applied to the uplink signals either per antenna element or per direction in which the uplink signals are received at the antenna elements. The combining could thus be performed either in the antenna element domain or in the direction domain, as the combining coefficients can be converted by transformation operations. An inverse DFT (IDFT) can be applied to the combining coefficients in the direction domain to obtain combining coefficients in the antenna element domain. That is, according to an embodiment the combining coefficients determined per direction are transformed to combining coefficients per antenna element.

The combining could be performed only for a subset of the antenna elements or directions.

In some aspects the combining in step S104 is performed only for a subset of the antenna elements. Hence, according to an embodiment the RRU 200 is configured to perform (optional) step S104a as part of step S104:

S104a: The RRU 200 selects to combine the received uplink signals from less than all the antenna elements for each user layer into the combined signals.

In some aspects the combining in step S104 is performed only for a subset of the directions. Hence, according to an embodiment the RRU 200 is configured to perform (optional) step S104b as part of step S104:

S104b: The RRU 200 selects to combine the received uplink signals from less than all the directions for each user layer into the combined signals when the combining coefficients are applied to the uplink signals per direction.

In some aspects the number of antenna elements/directions is larger than the number of user layers. According to an embodiment the received uplink signals from at least as many antenna elements as total number of user layers are combined for each user layer into the combined signals. According to an embodiment the received uplink signals from at least as many directions as total number of user layers are combined for each user layer into the combined signals.

The subset should be selected so as to capture most of the energy for each user layer. Therefore the channel coefficients can be used as a basis when determining from which antenna elements or directions to combine the received uplink signals. That is, according to an embodiment, from which less than all the antenna elements or directions to combine the received uplink signals is determined based on the channel coefficients.

One benefit of selecting only for a subset of the antenna elements or directions for the combining is that it can reduce the required computational complexity for combining. A second benefit is that when excluding directions with large channel estimation error it could improve the performance. The selection could be more useful in the direction domain than in the antenna domain, as the channel energy in the former could concentrate on a limited number of directions.

The channel coefficients could be estimated using reference signals, such as demodulation reference signals (DMRS) and/or sounding reference signals (SRS). That is, according to an embodiment the uplink signals comprise reference signals and wherein the reference signals received from the antenna elements or directions are extracted when capturing the energy in order to enable estimation of the channel coefficients using the reference signals.

Each user layer could correspond to independently scheduled information and thus represent a MIMO layer. Particularly, according to an embodiment the received signal in each user layer comprises independently scheduled information.

In some aspects separate streams of the uplink signals are sent for each polarization direction. Thus, according to an embodiment the received uplink signals are combined into separate combined signals for each polarization direction of the antenna elements. Further in this respect, one combined signal could either include different polarization directions, or the combining could be performed separately per polarization direction. If the combining is performed separately per polarization, there is thus one combined signal per user layer and polarization.

With two polarization directions, the RRU 200 could be configured to either combine the received uplink signals separately for each polarization direction (e.g. MRC or IRC) and thus provide one combined signal per polarization direction and user layer to the BBU 300, or combine the received uplink signals jointly for both polarization directions, thus including signals of both polarization directions in the combined signal per user layer (e.g. MRC or IRC), or combine the received uplink signals using MRC per polarization direction and then IRC between the signals per polarization direction to obtain one combined signal per user layer.

If e.g. MRC is used, it could be advantageous to perform the combining separately per polarization direction and then provide the thus separate combined signals for each polarization direction to the BBU for further processing (e.g. interference cancellation/rejection). Including both polarisation directions when performing MRC gives lower fronthaul bitrate but may give worse performance when considering interference from neighbouring cells. If the combining includes some kind of IRC, then the performance may be as good, or almost as good, as when separate combined signals for each polarization direction are sent over the FH interface.

Figure 4:
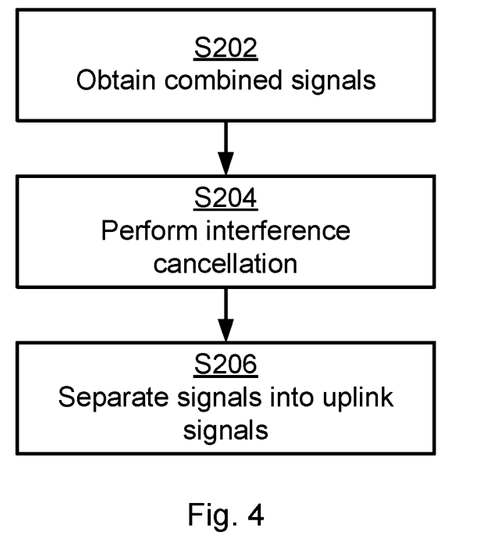

Reference is now made to FIG. 4 illustrating a method for processing uplink signals as performed by the BBU 300 according to an embodiment.

As disclosed above, the RRU in step S106 provides combined signals to the BBU. It is thus assumed that the BBU is configured to perform step S202:

S202: The BBU 300 obtains combined signals from the RRU 200. As disclosed above, each combined signal represents a combination of uplink signals received from wireless devices at antenna elements of an antenna array of the RRU 200, where each wireless device is associated with its own at least one user layer.

In some aspects the combined signals are obtained by the BBU 300 over a FH interface operatively connected between the RRU 200 and the BBU 300.

After the combining in step S104 as performed by the RRU, the number of combined signals equals the number of the user layers. But there could still exist mutual interference in each combined signals. Therefore, the BBU is configured to cancel the interferences and separate the user layer signals, for example, for further decoding. Hence, the BBU is configured to perform steps S204 and S206:

S204: The BBU 300 performs interference cancellation on each of the combined signals. The interference cancellation results in interference cancelled combined signals.

S206: The BBU 300 separates the interference cancelled combined signals into separated uplink signals for each user layer such that there is one separate user layer for each separated uplink signal.

Embodiments relating to further details of processing uplink signals as performed by the BBU 300 will now be disclosed.

There may be different ways to perform the interference cancellation in step S204. According to an embodiment the interference is cancelled using linear cancellation, such as zero-forcing (ZF) based interference cancellation or minimum mean square error (MMSE) based interference cancellation, or non-linear cancellation, such as successive interference cancellation (SIC).

As disclosed above, the combined signals could represent uplink signals received only for a subset of antennas. That is, according to an embodiment the combined signals represent the uplink signals as combined from less than all the antenna elements.

As disclosed above, the combined signals could represent uplink signals received only for a subset of directions. That is, according to an embodiment the combined signals represent the uplink signals as combined from less than all directions in which the uplink signals were received at the antenna elements.

Calculation of the cancellation coefficients commonly involves matrix inversion operations and thus could be require a high computational complexity. But the required computational complexity is lower than if the interference cancellation is performed directly on the uplink signals obtained from the antenna elements since the number of signals has been reduced to the number of user layers.

In some aspects there is a first beamforming sub-function performed in the RRU 200 regarding per user layer energy capturing and a second beamforming sub-function performed in the BBU 300 regarding interference cancellation between user layers on the combined signal after the first beamforming operation. For MIMO systems, beamforming is equivalent to spatial domain combining. It could thus be interpreted that steps S102-S104 (and, optionally, any of S104a, S104b) define a first beamforming sub-function that form a beam for each user-layer so as to capture most of the energy and maximize SNR, whilst keeping the channel matrix after combining well-conditioned. In this sense, the uplink signals can be regarded as transformed to the beam domain when steps S102-S104 (and, optionally, any of S104a, S104b) have been performed. Further, it could thus be interpreted that steps S202-S206 define a second beamforming sub-function for cancellation.

The process can be explained with the following example using the ZF based approach. For a MIMO system with a channel matrix H, ZF beamforming coefficients are applied to cancel out the interferences between user layers. Following the ZF principle, the ZF beamforming coefficients C can be formulated as the pseudo inverse of the channel matrix H, which can be expressed as:

$$C=H^+=(H^*H)^{-1}H^*$$

Here $H^+$ denotes the pseudo inverse of H and $H^*$ denotes the Hermitian transpose of H. Applying the ZF coefficients C to the received signal from the antenna elements, the received signals y after cancellation can be expressed as:

$$y=CHx+Cn=(H^*H)^{-1}(H^*H)x+(H^*H)^{-1}H^*n$$

In the above expression, n represents channel noise and x is the transmitted signal. Further, let $C_1=H^*$ and $C_2=(H^*H)^{-1}=(C_1H)^{-1}$, then the received signal y can be further expressed as:

$$y=C_2C_1Hx+C_2C_1n$$

It can be seen that the cancellation matrix C can be decomposed to $C_2C_1$, where $C_1=H^*$ is interpreted as the MRC operation and $C_2=(C_1H)^{-1}$ is interpreted as the ZF cancellation for the received signals after MRC. Therefore, a full ZF process can be seen as two sub-processes; MRC and a smaller ZF. This matches the functional split between the RRU and the BBU as proposed herein. In this case, the proposed functional split between the RRU and the BBU thus achieves full cancellation performance. The same principle applies to other types of cancellation schemes, such as MMSE based cancellation schemes.

Figure 5:
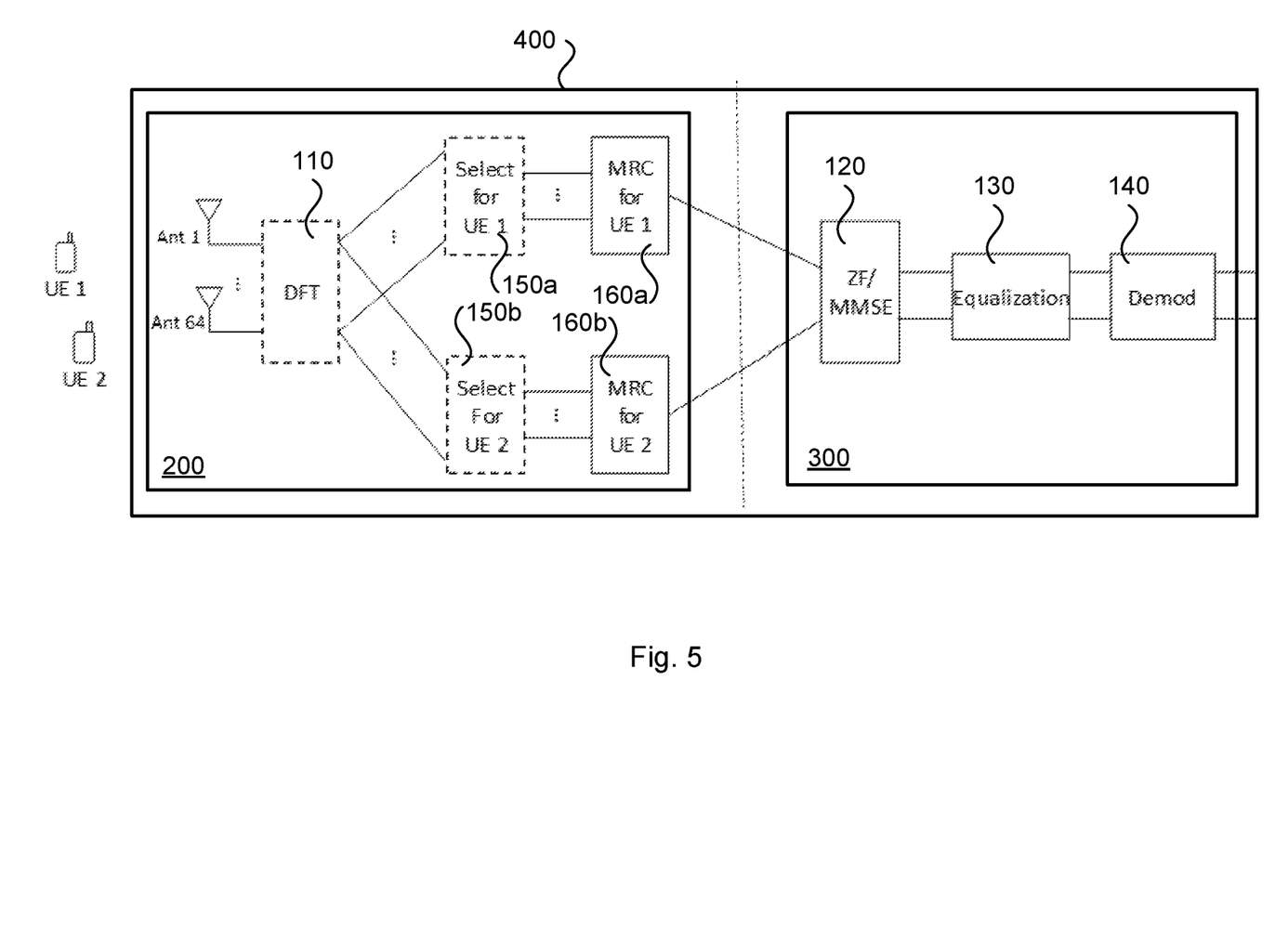
FIG. 5 is a schematic illustration of an access node according to an embodiment.

FIG. 5 shows a block diagram of the herein proposed RRU and BBU as provided in an access node 400. In the illustrative example of FIG. 5 the access node comprises 64 antenna elements (Ant 1, . . . , Ant 64) and serves two wireless devices (UE 1 and UE 2) with one antenna element on each wireless device.

The uplink signals from UE 1 and UE 2 are received at the 64 antennas of the access node and thus obtained by the RRU (as in step S102).

In some aspects the uplink signal received at each antenna element represents a subcarrier and thus the methods disclosed with respect to FIGS. 3, 4, and 5 are for processing uplink signals in frequency domain.

If the combining coefficients are to be determined in the direction domain, the uplink signals are transformed to the direction domain by applying a DFT to the uplink signals across the 64 antenna elements at DFT block 110. This is not needed if the combining coefficients are to be determined in the antenna element domain.

Similarly, channel estimation could be performed either in the direction domain by applying a DFT to the reference signals and then estimating the channel coefficients in the direction domain based on the received reference signals after DFT. From the channel coefficients estimated in the direction domain, an IDFT can be applied to obtain the channel coefficients in the antenna element domain.

Optionally, a subset of the signal contributions from each wireless device is selected (as in step S104a or S104b) at select blocks 150a, 150b. Specifically, one approach that selects the signal contributions for each user layer is where (1) the number of selected signal contributions is larger than, or equal to, the total number of user layers, and (2) the selected signal contributions capture most of the energy for each user layer. Criteria (1) guarantees that the matrix after the combining will be well-conditioned for matrix inversion (as used during interference cancellation), while criteria (2) makes sure that enough energy is captured for each user layer.

Then the signals are combined coherently for each user layer to maximize the SNR, according to the same channel estimate for each user (as in step S104). As an example, MRC is used for each user layer at MRC blocks 160a, 160b.

After the signal combining, the number of received signals is reduced to the number of user layers. These signals are then transported over the FH interface to the BBU (as in steps S106, S202).

There could still exist mutual interference between user layers as no explicit interference cancellation has been performed yet. Therefore, in the BBU, the interference is cancelled, for example using a zero-forcing (ZF)-based method, a minimum mean square error (MMSE)-based method, etc. (as in step S204) at ZF/MMSE block 120. Interference cancellation is thus performed only for as many signals as there are user layers, thereby reducing the requirements of computational complexity needed for determining the cancellation coefficients compared to the requirements needed for full interference cancellation performed directly on the antenna elements or directions, as is the case for the BBU-RRU arrangement of FIG. 1.

After the interference cancellation, the user layer signals are separated (as in step S206) for further processing, such as equalization (at equalization block 130), demodulation (at demodulation block 140), decoding, etc.

Simulation results of the herein disclosed BBU and RRU (as in FIG. 5) will now be compared to the BBU-RRU arrangements of FIGS. 1 and 2.

For the BBU-RRU arrangement of FIG. 2, two types of implementations have been used. The first implementation is denoted 'method 2 max sum pow' and is based on selecting the signal components with maximum energy for all users given a number of signal components to select. The second implementation is denoted 'method 2 "optimal"' and is derived with a goal to maximize the post-processing sum-SNR after interference cancellation, given a number of selected signal components.

The simulation setup will be described next.

The access node uses a 64-element uniform linear antenna array with half wavelength spacing between adjacent antenna elements and each antenna element being omni-directional. All elements have the same polarization.

There are 16 served wireless devices with one antenna each. Therefore, there are 16 user layers in total, where each wireless device has one layer.

The radio propagation channel comprises two multipath clusters, where each multipath cluster comprises one line of sight component (representing the strongest component in each cluster) and five multipath components. The amplitude of each component is Rayleigh distributed and the phase is uniformed distributed in the interval $[-\pi, \pi]$. The multipath components have 5-10 dB lower power than the line of sight component. The power offset is uniformly distributed in [5, 10] dB. The angle of arrival (AoA) of the line of sight component is uniformly distribute in [−60, 60] degrees, assuming coverage of a 120-degree cell sector. The multipath components have an angular spread of 5 degrees in each cluster with a uniform distribution in [−2.5, 2.5] degrees around the AoA of the line of sight component.

The simulation is performed in the direction domain by 64-point DFT (as implemented using an FFT), which means the dashed blocks illustrated in FIGS. 1, 2, and 3 are used.

Channel estimation is performed in the direction domain to improve the estimation accuracy, i.e. increasing the estimation SNR for strong directions.

The received SNR per antenna element is set to 0 dB. The SNR for channel estimation is set to 0, 3, and 6 dB.

ZF interference cancellation is used. For the BBU-RRU arrangement of FIG. 1, ZF interference cancellation is applied directly on all 64 signal components. For the BBU-RRU arrangement of FIG. 2, 32 signal components are selected. Then ZF interference cancellation is applied to the selected signal components. For the proposed BBU and RRU the 16 strongest signal components per wireless device is selected for MRC. After MRC, 16 combined signals are formed. Then ZF interference cancellation is applied to the 16 combined signals. All selection and cancellation operations are based on the estimated channel with assumed estimation SNR.

Figure 6:
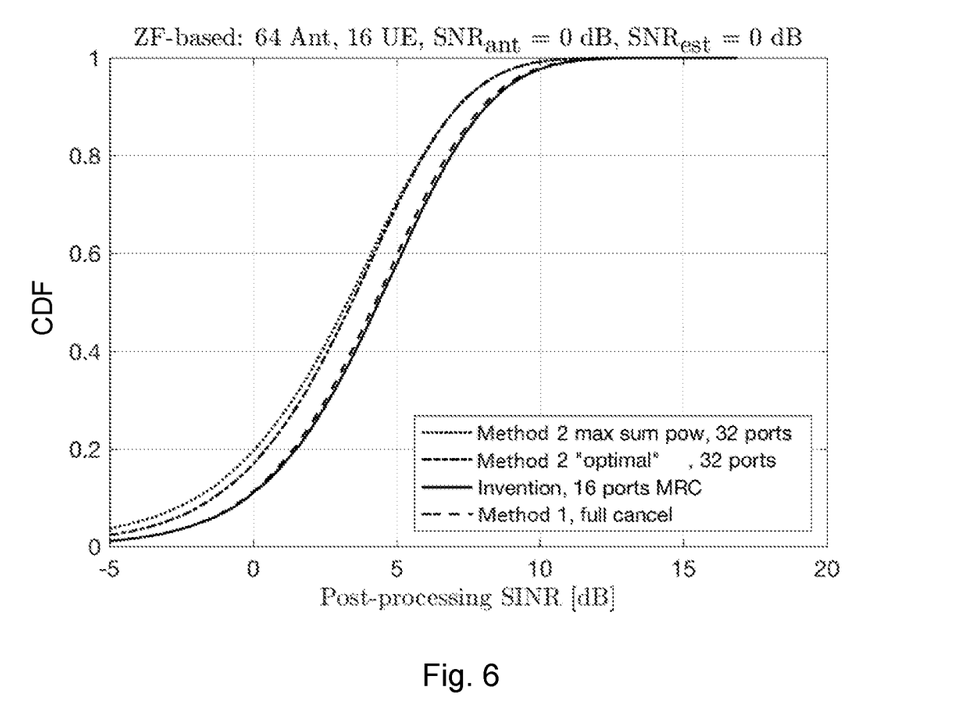
FIGS. 6, 7, 8, and 9 show simulation results according to embodiments.

FIG. 6 shows cumulative distribution functions (CDFs) of the SNR for all served wireless devices after interference cancellation where the mean SNR per antenna is set to 0 dB with the same SNR for channel estimation.

Figure 7:
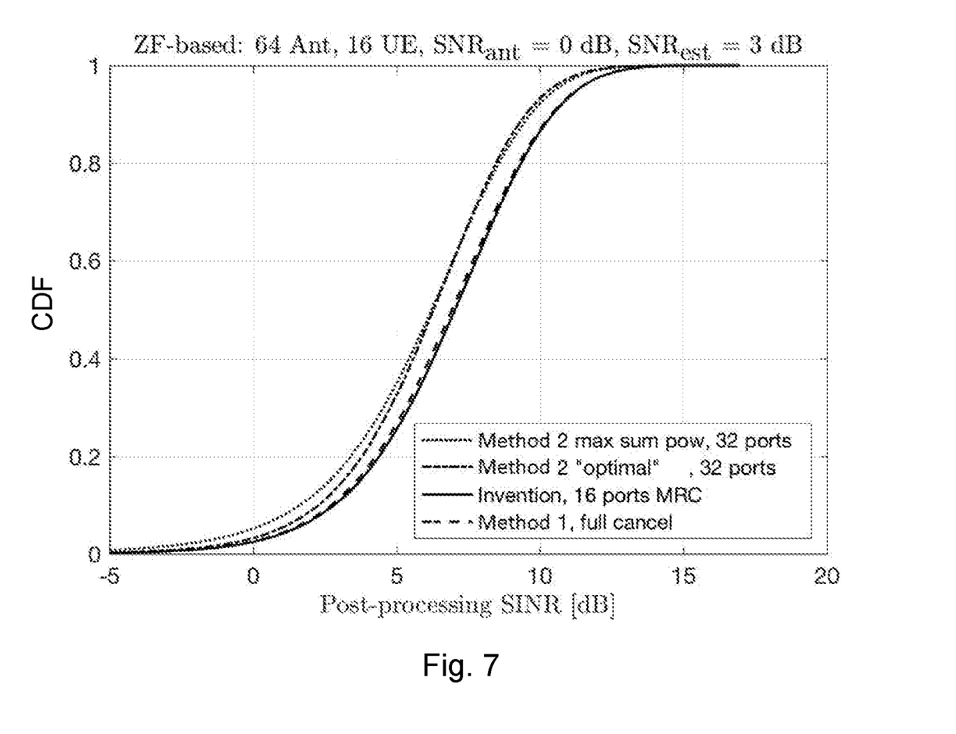

FIG. 7 shows CDFs of the SNR for all served wireless devices after interference cancellation where the mean SNR per antenna is set to 0 dB and with an improved SNR of 3 dB for channel estimation.

Figure 8:
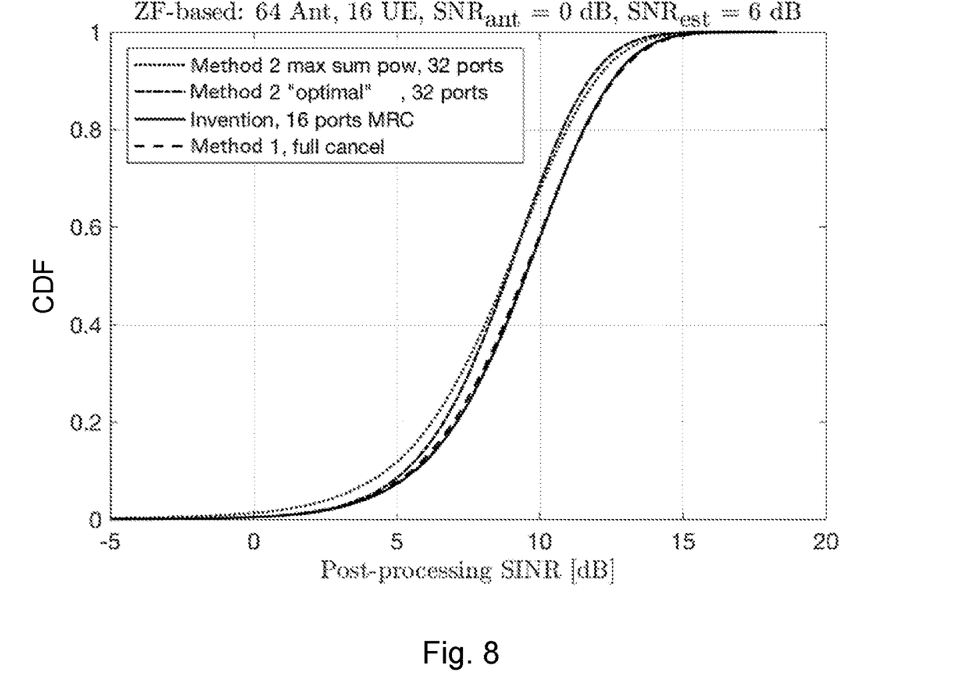

FIG. 8 shows CDFs of the SNR for all served wireless devices after interference cancellation where the mean SNR per antenna is set to 0 dB and with an improved SNR of 6 dB for channel estimation.

Figure 9:
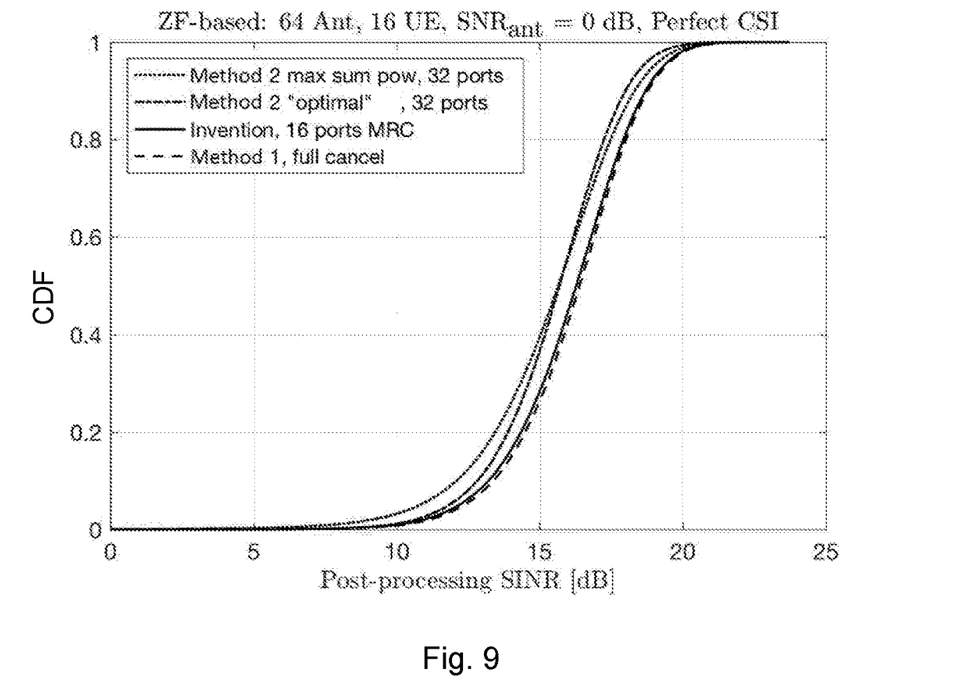

FIG. 9 shows CDFs of the SNR for all served wireless devices after interference cancellation where the mean SNR per antenna is set to 0 dB and with perfect channel estimation.

The simulation results show that the proposed BBU and RRU has best performance, even slightly better than the BBU-RRU arrangement of FIG. 1 with full cancellation. One reason is that the selective MRC excludes weak signal contributions of low SNR. The channel estimation error for these signal contributions of low SNR is quite large, which can negatively impact to the cancellation performance. Therefore, the proposed BBU and RRU achieve slightly better results by excluding the signal contributions of low SNR.

The simulation results show that both implementations of the BBU-RRU arrangement of FIG. 2 have the overall worst performance though it doubles the number of signal contributions to 32. One reason for this is that comparatively many signal contributions are needed to capture the most energy. In this case, when having a common selection for all user layers more received signals need to be used to capture the same amount energy than when performing the selection individually for each user layer.

The results also show that the performance is significantly increased if the channel estimation SNR is improved. This also justifies having the interference cancellation functionality in the BBU, such as enabled by the proposed BBU and RRU.

The herein disclosed embodiments can be applied to active distributed antenna systems, such as the so-called Radio Dot System (RDS). In a typical RDS each radio dot unit could have 2 or 4 antennas. A cluster of several radio dot units are connected to an indoor radio unit (IRU) and the time domain uplink signals are commonly combined into one cell by the IRU. Then the combined signal is sent to BBU for further processing. This reduces the aggregated traffic on the FH interface between the radio dot units and the BBU. Such a combining of radio dot units into cells usually does not implement any coherent combining schemes, resulting in comparatively high noise levels. Applying the functionality of the herein proposed BBU and RRU by implementing in frequency domain selective coherent combining in the IRU and interference cancellation in the BBU could enable multi-user MIMO (MU-MIMO) across a big cluster of radio dots and significantly increase the capacity and the scalability. For RDS, it could be sufficient to have an implementation in the antenna element domain, as the radio propagation channel for distributed antenna system is already colored in the antenna element domain.

For example, with 4 antennas on each radio dot units and 8 radio dot units combined into one cell, in the RRU the received streams from 32 antenna elements are first transformed to frequency domain and the herein disclosed methods are applied on each sub-carrier, or a group of sub-carriers. If four user layers are used, four ports for each user-layer can be selected and coherently combined in the RRU.

Figure 10:
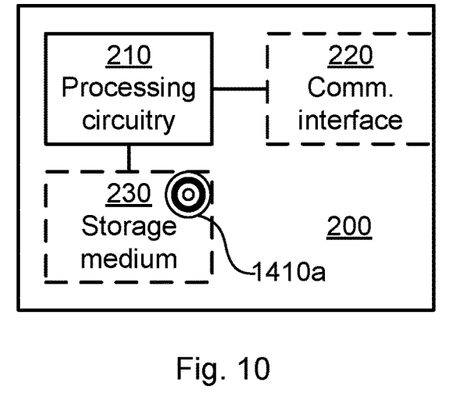
FIG. 10 is a schematic diagram showing functional units of a RRU according to an embodiment.

FIG. 10 schematically illustrates, in terms of a number of functional units, the components of a RRU 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the RRU 200 to perform a set of operations, or steps, S102-S106, as disclosed above. For example, the storage medium 230 may store the set of operations, and the processing circuitry 210 may be configured to retrieve the set of operations from the storage medium 230 to cause the RRU 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The RRU 200 may further comprise a communications interface 220 for communications at least with wireless devices over an air interface and with the BBU 300 over an FH interface. As such the communications interface 220 may comprise one or more transmitters and receivers, comprising analogue and digital components.

The processing circuitry 210 controls the general operation of the RRU 200 e.g. by sending data and control signals to the communications interface 220 and the storage medium 230, by receiving data and reports from the communications interface 220, and by retrieving data and instructions from the storage medium 230. Other components, as well as the related functionality, of the RRU 200 are omitted in order not to obscure the concepts presented herein.

Figure 11:
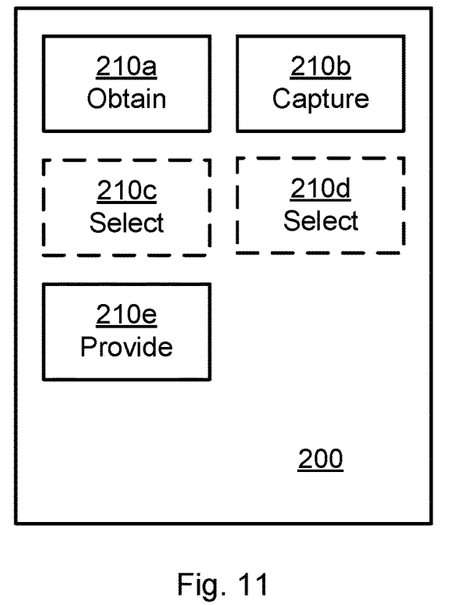
FIG. 11 is a schematic diagram showing functional modules of a RRU according to an embodiment.

FIG. 11 schematically illustrates, in terms of a number of functional modules, the components of a RRU 200 according to an embodiment. The RRU 200 of FIG. 11 comprises a number of functional modules; an obtain module 210a configured to perform step S102, a capture module 210b configured to perform step S104, and a provide module 210e configured to perform step S106. The RRU 200 of FIG. 11 may further comprise a number of optional functional modules, such as any of a first select module 210C configured to perform step S104a, and a second select module 210d configured to perform step S104b. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the RRU 200 as disclosed herein.

Figure 12:
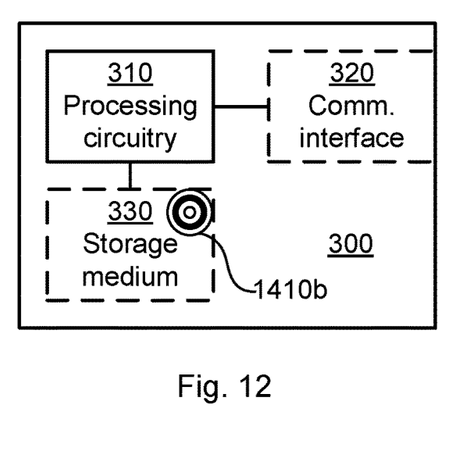
FIG. 12 is a schematic diagram showing functional units of a BBU according to an embodiment.

FIG. 12 schematically illustrates, in terms of a number of functional units, the components of a BBU 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the BBU 300 to perform a set of operations, or steps, S202-S206, as disclosed above. For example, the storage medium 330 may store the set of operations, and the processing circuitry 310 may be configured to retrieve the set of operations from the storage medium 330 to cause the BBU 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The BBU 300 may further comprise a communications interface 320 for communications at least with the RRU 200 over an FH interface and with other network nodes, entities, devices, and functions, over at least one other interface. As such the communications interface 320 may comprise one or more transmitters and receivers, comprising analogue and digital components.

The processing circuitry 310 controls the general operation of the BBU 300 e.g. by sending data and control signals to the communications interface 320 and the storage medium 330, by receiving data and reports from the communications interface 320, and by retrieving data and instructions from the storage medium 330. Other components, as well as the related functionality, of the BBU 300 are omitted in order not to obscure the concepts presented herein.

Figure 13:
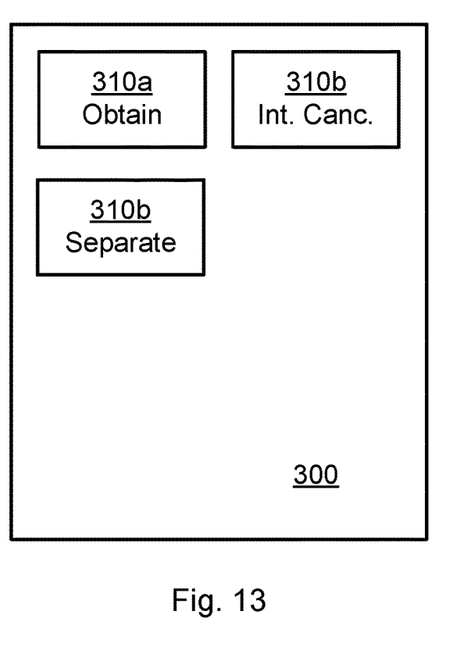
FIG. 13 is a schematic diagram showing functional modules of a BBU according to an embodiment.

FIG. 13 schematically illustrates, in terms of a number of functional modules, the components of a BBU 300 according to an embodiment. The BBU 300 of FIG. 13 comprises a number of functional modules; an obtain module 310a configured to perform step S202, an interference cancellation module 310b configured to perform step S206, and a separate module 310c configured to perform step S206. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the BBU 300 as disclosed herein.

The RRU 200 and BBU 300 may be provided as stand-alone devices or as a part of at least one further device. For example, as disclosed above the RRU 200 and BBU 300 may be provided in an access node. That is, as in FIG. 5, an access node 400 could comprise a BBU 300 as herein proposed and at least one RRU 200 as herein proposed. Alternatively, functionality of the RRU 200 and BBU 300 may be distributed between at least two devices, or nodes.

Thus, a first portion of the instructions performed by the RRU 200 or BBU 300 may be executed in a first device, and a second portion of the of the instructions performed by the RRU 200 or BBU 300 may be executed in a second device; the herein disclosed embodiments are not limited to any particular number of devices on which the instructions performed by the RRU 200 or BBU 300 may be executed. Hence, the methods according to the herein disclosed embodiments are suitable to be performed by a RRU 200 or BBU 300 residing in a cloud computational environment. Therefore, although a single processing circuitry 210, 310 is illustrated in FIGS. 10 and 12 the processing circuitry 210, 310 may be distributed among a plurality of devices, or nodes. The same applies to the functional modules 210a-210e, 310a-310c of FIGS. 11 and 13 and the computer programs 1420a, 1420b of FIG. 14 (see below).

Figure 14:
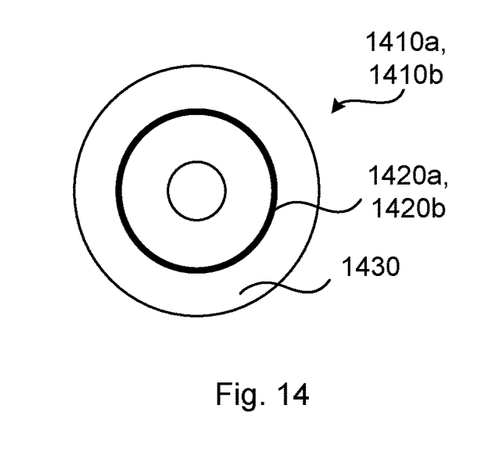
FIG. 14 shows one example of a computer program product comprising computer readable means according to an embodiment.

FIG. 14 shows one example of a computer program product 1410a, 1410b comprising computer readable means 1430. On this computer readable means 1430, a computer program 1420a can be stored, which computer program 1420a can cause the processing circuitry 210 and thereto operatively coupled entities and devices, such as the communications interface 220 and the storage medium 230, to execute methods according to embodiments described herein. The computer program 1420a and/or computer program product 1410a may thus provide means for performing any steps of the RRU 200 as herein disclosed. On this computer readable means 1430, a computer program 1420*b* can be stored, which computer program 1420*b* can cause the processing circuitry 310 and thereto operatively coupled entities and devices, such as the communications interface 320 and the storage medium 330, to execute methods according to embodiments described herein. The computer program 1420*b* and/or computer program product 1410*b* may thus provide means for performing any steps of the BBU 300 as herein disclosed.

In the example of FIG. 14, the computer program product 1410*a*, 1410*b* is illustrated as an optical disc, such as a CD (compact disc) or a DVD (digital versatile disc) or a Blu-Ray disc. The computer program product 1410*a*, 1410*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420*a*, 1420*b* is here schematically shown as a track on the depicted optical disk, the computer program 1420*a*, 1420*b* can be stored in any way which is suitable for the computer program product 1410*a*, 1410*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for processing uplink signals, the method being performed by a remote radio unit, RRU, the method comprising:
    obtaining uplink signals as received from wireless devices at antenna elements of an antenna array of the RRU, each wireless device being associated with its own at least one user layer;
    capturing energy per user layer by combining the received uplink signals from the antenna array for each user layer into combined signals, resulting in one combined signal per user layer, wherein the combining for each individual user layer is based on channel coefficients of the wireless device associated with said each individual user layer; and
    providing the combined signals to a baseband unit, BBU.

2. The method according to claim 1, wherein the received uplink signals are combined using maximum-ratio combining and/or interference rejection combining.

3. The method according to claim 1, wherein the channel coefficients pertain to at least one channel property of a radio propagation channel extending between the wireless device of said each individual user layer and the antenna array of the RRU in a direction from the wireless device to the antenna array.

4. The method according to claim 1, wherein combining coefficients are applied to the uplink signals for combining the received uplink signals, and wherein the combining coefficients are based on the channel coefficients for each user layer.

5. The method according to claim 4, wherein the combining coefficients are determined either per antenna element or per direction in which the uplink signals are received at the antenna elements.

6. The method according to claim 4, wherein the combining coefficients are applied to the uplink signals either per antenna element or per direction in which the uplink signals are received at the antenna elements.

7. The method according to claim 6, wherein the uplink signals per antenna element are transformed to uplink signals per direction before the combining coefficients are applied to the uplink signals per direction.

8. The method according to claim 5, wherein the combining coefficients determined per direction are transformed to combining coefficients per antenna element.

9. The method according to claim 1, wherein the uplink signals comprises reference signals and wherein the reference signals are extracted when capturing the energy.

10. The method according to claim 1, wherein the received signal in each user layer comprises independently scheduled information.

11. The method according to claim 1, further comprising:
    selecting to combine the received uplink signals from less than all the antenna elements for each user layer into the combined signals.

12. The method according to claim 11, wherein the received uplink signals from at least as many antenna elements as total number of user layers are combined for each user layer into the combined signals.

13. The method according to claim 5, further comprising:
    selecting to combine the received uplink signals from less than all the directions for each user layer into the combined signals when the combining coefficients are applied to the uplink signals per direction.

14. The method according to claim 13, wherein the received uplink signals from at least as many directions as total number of user layers are combined for each user layer into the combined signals.

15. The method according to claim 3 in combination with claim 11, wherein from which less than all the antenna elements or directions to combine the received uplink signals is determined based on the channel coefficients.

16. The method according to claim 1, wherein the received uplink signals are combined into separate combined signals for each polarization direction of the antenna elements.

17. A method for processing uplink signals, the method being performed by a baseband unit, BBU, the method comprising:
    obtaining combined signals from a remote radio unit, RRU, wherein each combined signal represents a combination of uplink signals received from wireless devices at antenna elements of an antenna array of the RRU, each wireless device being associated with its own at least one user layer;
    performing interference cancellation on each of the combined signals, resulting in interference cancelled combined signals; and
    separating the interference cancelled combined signals into separated uplink signals for each user layer such that them is one separate user layer for each separated uplink signal.

18. The method according to claim 17, wherein the interference is cancelled using linear cancellation, such as zero-forcing interference cancellation or minimum mean square error interference cancellation, or non-linear cancellation, such as successive interference cancellation.

19. The method according to claim 17, wherein the combined signals represent the uplink signals as combined from less than all the antenna elements.

20. The method according to claim 17, wherein the combined signals represent the uplink signals as combined from less than all directions in which the uplink signals were received at the antenna elements.

21. A remote radio unit, RRU, for processing uplink signals, the RRU comprising processing circuitry, the processing circuitry being configured to cause the RRU to:
obtain uplink signals as received from wireless devices at antenna elements of an antenna array of the RRU, each wireless device being associated with its own at least one user layer;
capture energy per user layer by combining the received uplink signals from the antenna array for each user layer into combined signals, resulting in one combined signal per user layer, wherein the combining for each individual user layer is based on channel coefficients of the wireless device associated with said each individual user layer; and
provide the combined signals to a baseband unit, BBU.

22. A baseband unit, BBU, for processing uplink signals, the BBU comprising processing circuitry, the processing circuitry being configured to cause the BBU to:
obtain combined signals from a remote radio unit, RRU, wherein each combined signal represents a combination of uplink signals received from wireless devices at antenna elements of an antenna array of the RRU, each wireless device being associated with its own at least one user layer;
perform interference cancellation on each of the combined signals, resulting in interference cancelled combined signals; and
separate the interference cancelled combined signals into separated uplink signals for each user layer such that there is one separate user layer for each separated uplink signal.

* * * * *